United States Patent
Alvarez et al.

(10) Patent No.: US 8,434,521 B2
(45) Date of Patent: May 7, 2013

(54) VALVE UNIT AND METHODS FOR FASTENING A VALVE UNIT TO A BASE

(75) Inventors: Raphael Alvarez, Geneva (CH); Pierre Sirdey, Geneva (CH)

(73) Assignee: Fluid Automation Systems S.A., Geneva (CH)

( * ) Notice: Subject to any disclaimer, the term of this patent is extended or adjusted under 35 U.S.C. 154(b) by 756 days.

(21) Appl. No.: 12/438,446

(22) PCT Filed: Sep. 26, 2006

(86) PCT No.: PCT/EP2006/009339
§ 371 (c)(1),
(2), (4) Date: Feb. 23, 2009

(87) PCT Pub. No.: WO2008/037271
PCT Pub. Date: Apr. 3, 2008

(65) Prior Publication Data
US 2009/0260693 A1    Oct. 22, 2009

(51) Int. Cl.
*F16K 11/10*    (2006.01)
(52) U.S. Cl.
USPC ................ 137/884; 411/84; 411/999
(58) Field of Classification Search .......... 137/884; 411/84, 442, 444, 512, 999; 403/334, 335, 403/337
See application file for complete search history.

(56) References Cited

U.S. PATENT DOCUMENTS

| | | | | |
|---|---|---|---|---|
| 561,604 | A * | 6/1896 | Perry | 411/88 |
| 611,022 | A * | 9/1898 | Perry | 411/88 |
| 3,513,876 | A * | 5/1970 | Tarbox | 137/596 |
| 3,542,073 | A * | 11/1970 | Holbrook | 137/625.66 |
| 3,654,960 | A | 4/1972 | Kiernan | |
| 4,267,870 | A | 5/1981 | Warner | |
| 4,740,124 | A * | 4/1988 | Pearson et al. | 411/88 |
| 5,813,791 | A * | 9/1998 | Kubota | 403/294 |
| 6,425,416 | B1 * | 7/2002 | Narita et al. | 137/625.27 |
| 6,874,537 | B2 * | 4/2005 | Hayashi et al. | 137/884 |
| 6,974,275 | B2 * | 12/2005 | Nago et al. | 403/21 |
| 7,182,102 | B2 * | 2/2007 | Karcher | 137/884 |
| 7,252,116 | B2 * | 8/2007 | Miyazoe et al. | 137/625.64 |
| 2005/0072948 | A1 | 4/2005 | Fukano et al. | |

FOREIGN PATENT DOCUMENTS

| | | |
|---|---|---|
| DE | 10343249 A1 | 4/2005 |
| DE | 202005005908 U1 | 7/2005 |
| EP | 1375928 A2 | 1/2004 |
| WO | WO-2005/090800 A1 | 9/2005 |

* cited by examiner

*Primary Examiner* — John Fox
(74) *Attorney, Agent, or Firm* — The Ollila Law Group LLC

(57) ABSTRACT

A valve unit (120) is provided according to the invention. The valve unit (120) includes a valve body (121), two or more fasteners (128) adapted for affixing the valve body (121) to a base, and two or more fastener grooves (125) formed in two or more sides of the valve body (121). The two or more corresponding fasteners (128) rest in the two or more fastener grooves (125). The valve unit (120) further includes a fastener link (100) extending between the two or more fasteners (128) and holding the two or more fasteners (128) substantially in the two or more grooves (125).

5 Claims, 5 Drawing Sheets

VALVE UNIT AND METHODS FOR FASTENING A VALVE UNIT TO A BASE

BACKGROUND OF THE INVENTION

1. Field of the Invention

The present invention relates to a valve unit and methods for fastening a valve unit to a base.

2. Statement of the Problem

A valve island is a grouping of multiple valves that are used to meter and/or control the flow of fluids. The fluids can include liquids and gases. A valve island is commonly used to provide and control multiple fluid streams to a common device or for a common purpose. For example, in the pharmaceutical industry, multiple valves may be used to meter out compounds that are mixed in order to form a final compound. Another use of a valve island is in metering fluids in biotech applications. Yet another use is a valve island for controlling the delivery of pressurized gases in an industrial setting.

A valve island comprises a base that provides common installation/affixing features. The valves of a valve island are grouped together on this base. The individual valve units of the valve island can be added and removed as desired and the numbers of valves can be selected and changed. In addition, valves of different types or having different operating characteristics can be selected and installed on the valve-island.

In the prior art, a valve unit is often affixed to a base by fasteners, such as machine screws, for example. Such a prior art fastener is typically located at the sides of the valve unit, and compresses the valve unit onto the base. A fastener located in between multiple valves of a valve grouping holds a valve on each side of it, and therefore cannot flex, move, or bend. However, in the prior art, a fastener on a side of a valve unit that does not contact or abut another valve unit is free to move away from the valve unit in question. Consequently, the fastener can move or flex away from the valve unit. In some circumstances, the fastener can bend or otherwise deform. This leads to improper seating of the valve unit on the valve island.

SUMMARY OF THE INVENTION

A valve unit is provided according to an embodiment of the invention. The valve unit comprises a valve body, two or more fasteners adapted for affixing the valve body to a base, and two or more fastener grooves formed in two or more sides of the valve body. The two or more corresponding fasteners rest in the two or more fastener grooves. The valve unit further comprises a fastener link extending between the two or more fasteners and holding the two or more fasteners substantially in the two or more grooves.

A method of fastening a valve unit to a base is provided according to an embodiment of the invention. The method comprises placing a fastener link onto the valve unit and inserting two or more fasteners through two or more corresponding fastener apertures in the fastener, link. The two or more fasteners are held substantially in two or more corresponding fastener grooves formed in two or more sides of the valve unit. The method further comprises affixing the two or more fasteners to the base.

A method of fastening three or more valve units to a base is provided according to an embodiment of the invention. The method comprises placing two fastener links onto two outer valve units of the three or more valve units and inserting two pairs of fasteners through two pairs of corresponding fastener apertures in the two fastener links. A pair of fasteners is held substantially in a pair of corresponding fastener grooves formed in two or more sides of the corresponding valve unit. The method further comprises affixing the two pairs of fasteners to the base.

A method of fastening two or more valve units to a base is provided according to an embodiment of the invention. The method comprises placing at least one fastener link onto the two or more valve units and inserting fasteners through corresponding fastener apertures in the at least one fastener link. The fasteners are held substantially in corresponding fastener grooves formed in two or more sides of the corresponding valve unit. The method further comprises affixing the fasteners to the base.

ASPECTS OF THE INVENTION

In one embodiment of the valve unit, the valve unit further comprises a corresponding fastener link depression formed in the valve body and shaped to substantially receive the fastener link.

In another embodiment of the valve unit, the valve unit further comprises a corresponding fastener link depression formed in the valve body and shaped to substantially receive the fastener link, with the fastener link depression including a depth that is substantially equal to a thickness of the fastener link, wherein the fastener link is at least substantially flush with an exterior surface of the valve body when the fastener link is located in the fastener link depression.

In yet another embodiment of the valve unit, the fastener link comprises enlarged ends, fastener apertures formed in the enlarged ends, and a central link that joins the enlarged ends.

In yet another embodiment of the valve unit, the fastener link comprises enlarged ends, with the enlarged ends being split and deformed, fastener apertures formed in the enlarged ends, and a central link that joins the enlarged ends.

In yet another embodiment of the valve unit, the fastener link is formed of a substantially elastic material.

In yet another embodiment of the valve unit, the valve unit further comprises an indicium formed on the fastener link.

In one embodiment of the method, the valve unit comprises a valve body, the two or more fasteners adapted for affixing the valve body to a base, the two or more fastener grooves formed in two or more sides of the valve body, wherein the two or more corresponding fasteners rest in the two or more fastener grooves, and the fastener link extending between the two or more fasteners and holding the two or more fasteners substantially in the two or more grooves.

In another embodiment of the method, the valve unit comprises a corresponding fastener link depression formed in the valve body and shaped to substantially receive the fastener link.

In yet another embodiment of the method, the valve unit comprises a corresponding fastener link depression formed in the valve body and shaped to substantially receive the fastener link, with the fastener link depression including a depth that is substantially equal to a thickness of the fastener link, wherein the fastener link is at least substantially flush with an exterior surface of the valve body when the fastener link is located in the fastener link depression.

In yet another embodiment of the method, the fastener link comprises enlarged ends, fastener apertures formed in the enlarged ends, and a central link that joins the enlarged ends.

In yet another embodiment of the method, the fastener link comprises enlarged ends, with the enlarged ends being split and deformed, fastener apertures formed in the enlarged ends, and a central link that joins the enlarged ends.

In yet another embodiment of the method, the fastener link is formed of a substantially elastic material.

In yet another embodiment of the method, the valve unit further comprises an indicium formed on the fastener link.

DESCRIPTION OF THE DRAWINGS

The same reference number represents the same element on all drawings. It should be understood that the drawings are not necessarily to scale.

DETAILED DESCRIPTION OF THE INVENTION

FIGS. 1-9 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
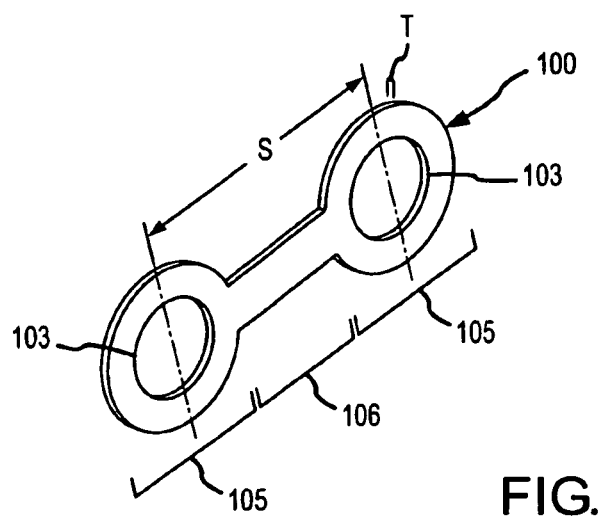
FIG. 1 shows a fastener link according to an embodiment of the invention.

FIG. 1 shows a fastener link 100 according to an embodiment of the invention. Components in common with other figures share reference numbers. The fastener link 100 can have a thickness T. The fastener link 100 includes enlarged ends 105 and a central link 106 that joins the enlarged ends 105. Each enlarged end includes a fastener aperture 103. An enlarged end 105 can be substantially circular in shape and the corresponding fastener aperture 103 can also be substantially circular. However, other shapes of the enlarged ends 105 are contemplated and are within the scope of the description and claims. A span S between centers of the fastener apertures 103 corresponds to a fastener spacing S on a corresponding valve unit 120 (see FIG. 2).

The fastener link material can comprise any suitable material. The thickness and material of the fastener link 100 are chosen so that the fastener link 100 has sufficient strength and durability to hold fasteners in position. The fastener link 100 can be rigid or flexible, hard or resilient, etc. In one embodiment, the fastener link 100 can be formed out of a sheet material, such as by cutting, stamping, etc. The fastener link 100 can be formed of an elastic material and can be used as an elastic washer or fastener locking device (see FIG. 5 and the accompanying discussion).

Figure 2:
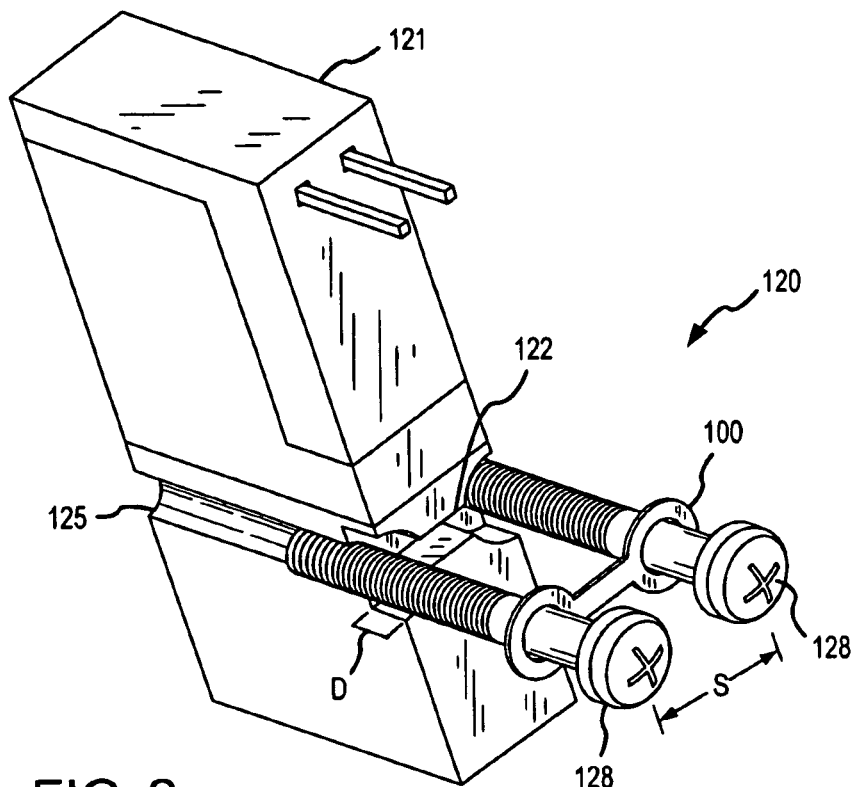
FIG. 2 shows a valve unit according to an embodiment of the invention.

It should be noted that the enlarged ends 105 can be of any size in relation to fasteners 128 (see FIG. 2). In one embodiment, the enlarge ends 105 can be larger than a fastener head, and therefore can serve as a washer and enlarge a surface contact area between a head of a fastener 128 and the underlying valve unit(s) 120.

FIG. 2 shows a valve unit 120 according to an embodiment of the invention. The valve unit 120 includes a valve body 121, a fastener link depression 122, two or more fastener grooves 125, and two or more fasteners 128. In addition, the valve unit 120 includes a fastener link 100 assembled to the valve body 121. The fastener link depression 122 includes a depth D and is shaped to substantially receive the fastener link 100. In use, the fasteners 128 are inserted through the fastener apertures 103 and the fastener link 100 fits at least partially into the fastener link depression 122.

The fasteners 128 can removably affix the valve unit 120 to any manner of base. For example, the valve unit 120 may be removably affixed to a valve island (not shown), wherein valve units of the valve island are connected to some manner of controller and the valve units are operated by the controller. The fasteners 128 can comprise any suitable fasteners.

The fastener grooves 125 receive a portion of a fastener 128. In one embodiment, a fastener groove 125 receives substantially half of a fastener 128, wherein fastener grooves 125 of two adjacent valve units 120 accept a fastener 128.

The fastener link 100 is used in order to keep the fasteners 128 in the fastener grooves 125. It can be seen from the figure that the fasteners 128 will not satisfactorily hold the valve unit 120 if the fasteners 128 can bend, flex, or otherwise move away from the valve body 121. This is especially helpful where a valve unit 120 does not have another valve unit 120 adjacent to it, so that two valve units can form a complete aperture for a fastener 128 from two such fastener grooves 125.

The fastener link depression 122 in one embodiment includes a depth D that is substantially equal to the thickness T of the fastener link, wherein the fastener link is at least substantially flush with an exterior of the valve body 121 when the fastener link 100 is located in the fastener link depression 122. Alternatively, the depth D can be greater than the thickness T of the fastener link 100, wherein the fastener link 100 is substantially recessed in the valve body 101 when in place in the fastener link depression 122 (see FIG. 4). However, it should be understood that the depth D can be of any dimension in relation to the thickness T of the fastener link 100.

In some embodiments, the fastener link 100 is held in the fastener link depression 122, such as by a friction or snap fit. Alternatively, the fastener link 100 can be held in the fastener link depression 122 by any manner of clue, bonding agent, etc. In yet another alternative, the fastener link 100 is not held by the fastener link depression 122 and is held to a valve unit 120 by only the fasteners 128.

The fastener link 100 can be assembled to a valve unit 120 before the valve unit 120 is assembled to a base. For example, the fastener apertures 103 can provide a friction fit to the fasteners 128, wherein the fasteners 128 can be assembled to the fastener link 100 prior to any other assembly action. If the fastener link 100 is held in the fastener link depression 122 (such as a friction fit, for example), then the valve unit 120, fastener link 10, and fasteners 128 can be provided as a complete unit, ready for assembly to a base. Other combinations are contemplated and are within the scope of the description and claims.

In addition to holding the fasteners 128, the fastener link 100 can perform other functions. The fastener link 100 can function as a manual override stop, wherein the fastener link 100 can stop motion of a valve component. The fastener link 100 can be used for product identification and can bear any manner of product marking or indicium. The fastener link 100 can be used for pre-mounting a valve row.

Figure 3:
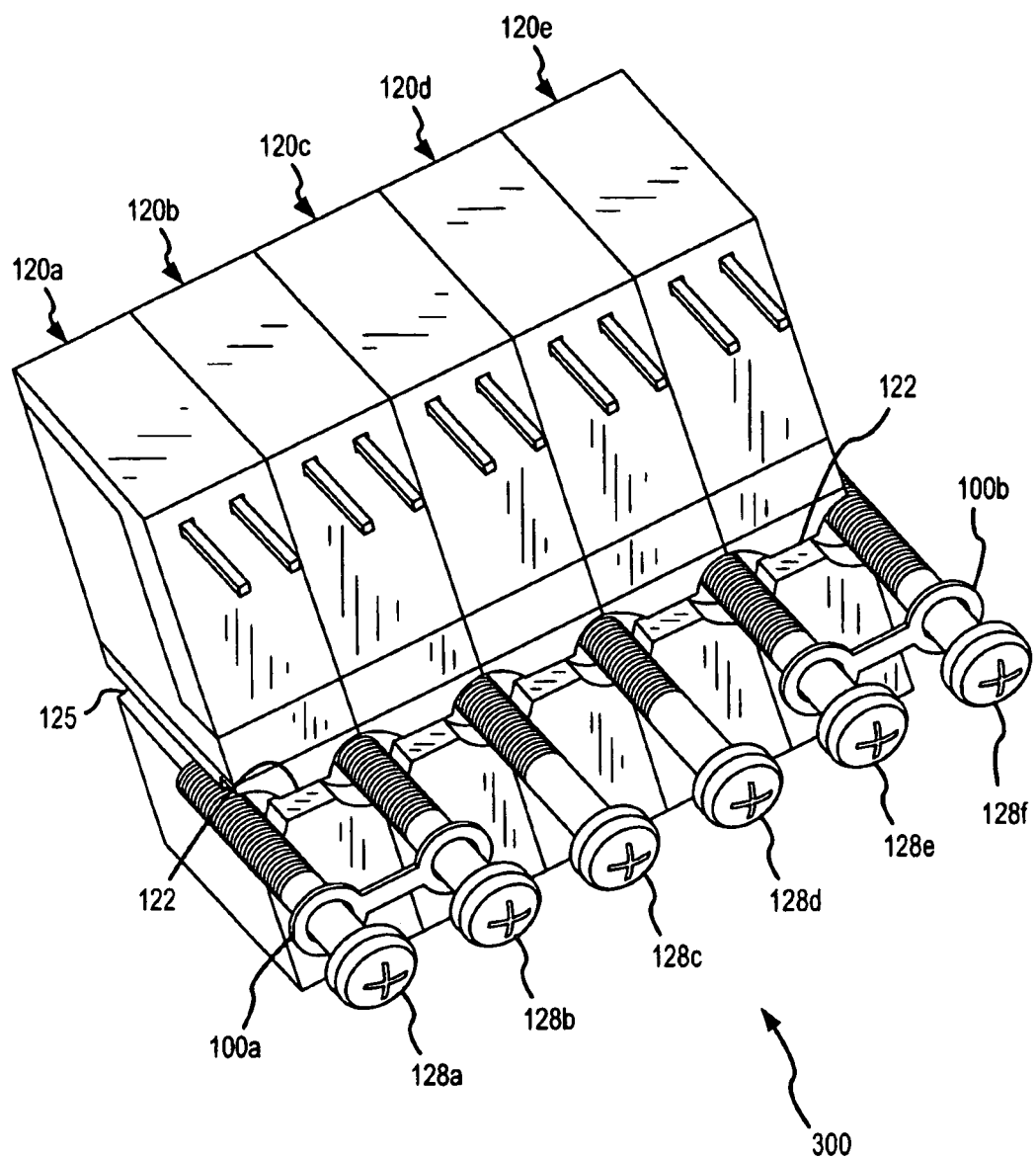
FIG. 3 shows a valve grouping according to an embodiment of the invention.

FIG. 3 shows a valve grouping 300 according to an embodiment of the invention. The valve grouping 300 comprises a grouping of multiple individual valve units 120 assembled into a block. The valve grouping 300 can be affixed to a valve island, for example.

In the figure, a fastener link 100 is used for the valve units 120 at the two ends of the valve grouping 300. The two fastener links 100 are therefore employed in order to keep the end fasteners 128a and 128f from bending or moving with respect to corresponding fastener grooves 125. It should be noted that fasteners 128 that are not at the edges of the valve grouping 300 will not need fastener links 100. Consequently, only two fastener links 100 are necessary for the valve grouping 300. It should be noted that a fastener link 100 in position on a valve unit, such as on valve unit 120a, will overlap onto and also retain an adjacent valve unit, such as valve unit 120b in the figure. As a result, fastener links 100 can be applied to every other valve unit, if desired.

A method of fastening a valve unit to a base comprises placing a fastener link onto the valve unit, inserting two or more fasteners through two or more corresponding fastener apertures in the fastener link, wherein the two or more fasteners are held substantially in two or more corresponding fastener grooves formed in two or more sides of the valve unit, and affixing the two or more fasteners to the base.

Figure 4:
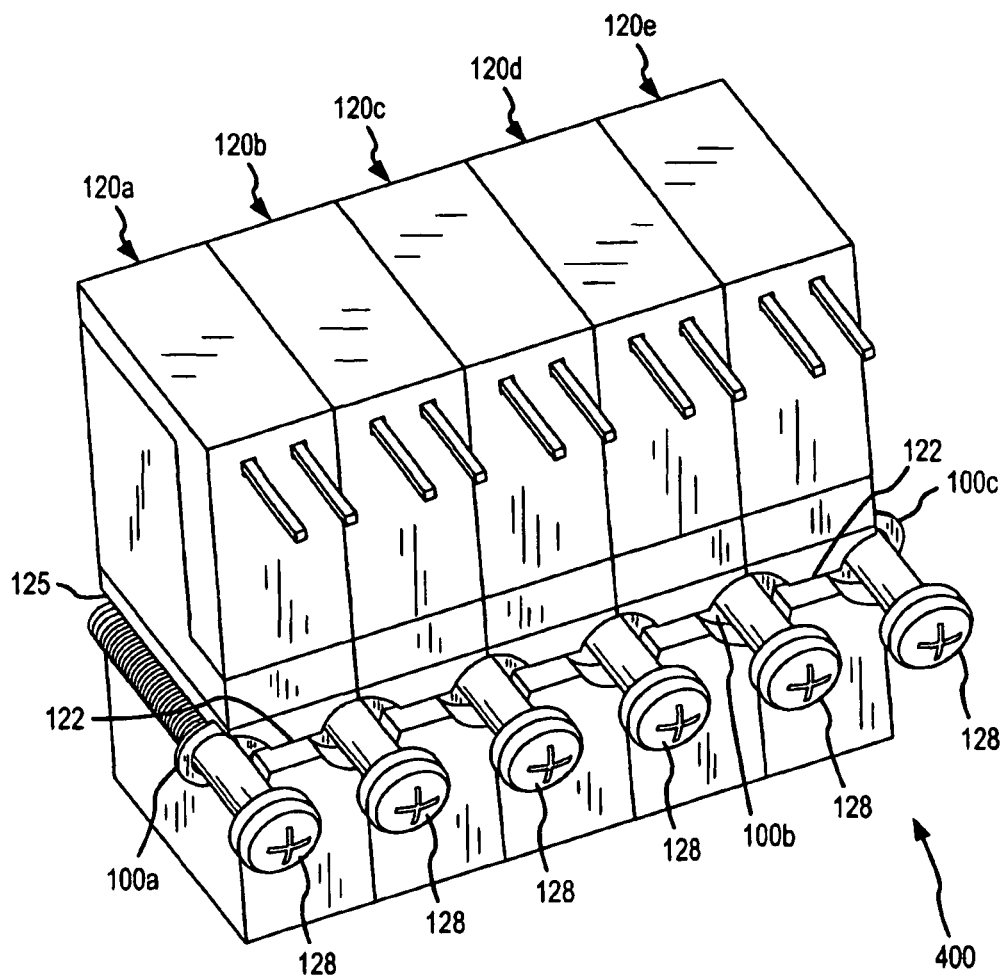
FIG. 4 shows a valve grouping according to an embodiment of the invention.

FIG. 4 shows a valve grouping 400 according to an embodiment of the invention. The valve grouping 400 in this embodiment can include multiple fastener links 100, including three fastener links 100a, 100b, and 110c in this example. Consequently, the five valve units 120 in this figure can receive three fastener links 100. Further, the fastener links 100 can be overlapping, and as a result, more than three fastener links 100 can be used for the five valve units 120, if desired (see FIGS. 8 and 9).

Alternatively, only one fastener link 100 can be used. In such an embodiment, the fastener link 100 includes multiple enlarged ends (see FIG. 7). As a result, the multiple valve units can be held together as a unit for handling and/or assembly.

Figure 5:
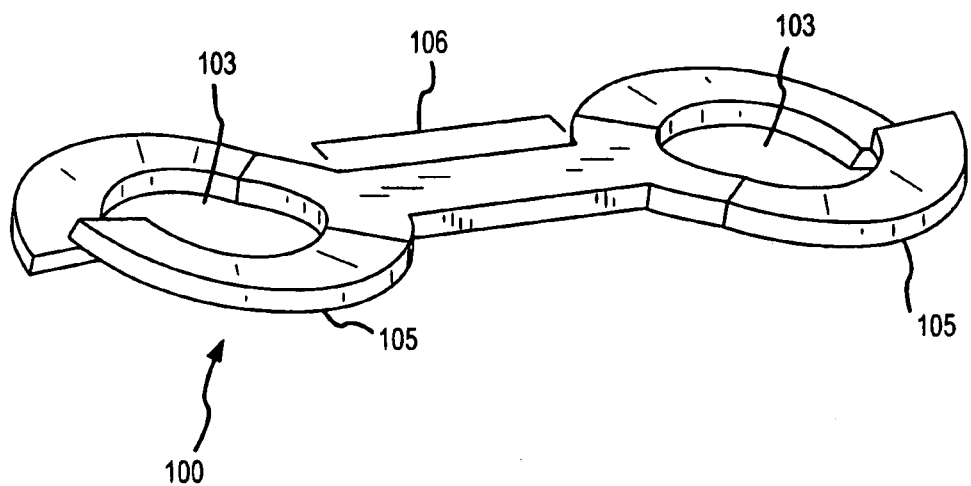
FIG. 5 shows the fastener link according to an embodiment of the invention.

FIG. 5 shows the fastener link 100 according to an embodiment of the invention. In this embodiment, the enlarged ends 105 are split and deformed, wherein the ends at the split are not aligned. In addition, the fastener link 100 can be formed of a resilient material, wherein a compression force is required in order to squash or flatten the enlarged ends 105. In this manner, a fastener link 100 may place a retaining force on an associated threaded fastener in order to substantially prevent the threaded fastener from rotating.

Figure 6:
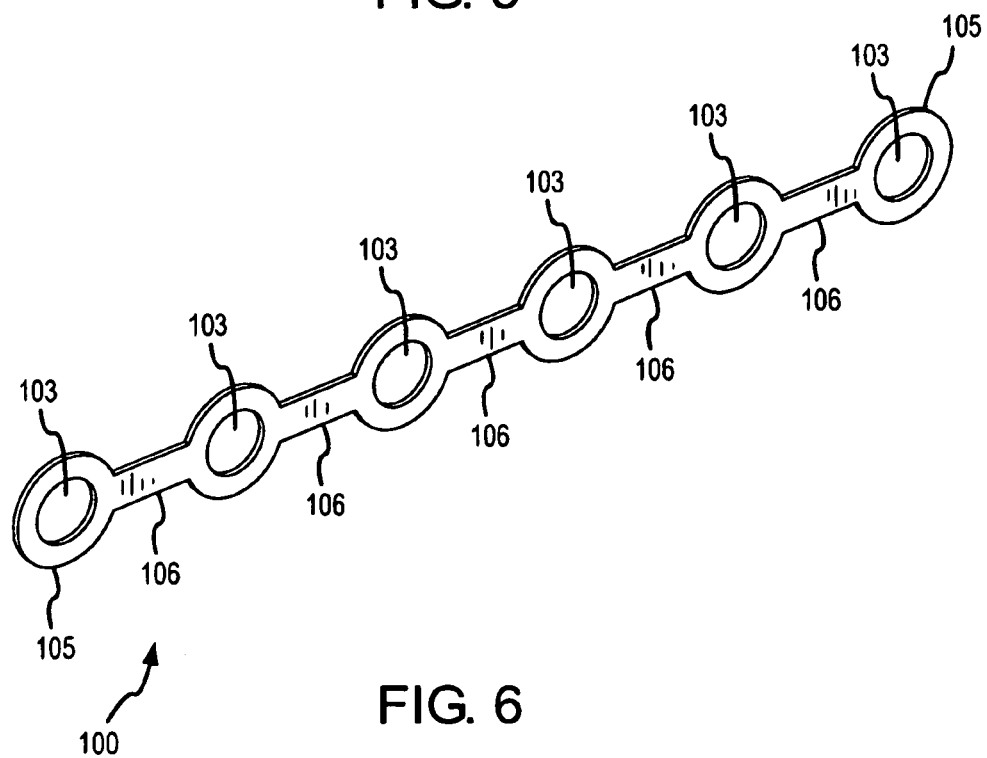
FIG. 6 shows the fastener link according to an embodiment of the invention.

FIG. 6 shows the fastener link 100 according to an embodiment of the invention. In this embodiment, the fastener link 100 includes more than two enlarged ends 105 and multiple central links 106. Such a fastener link 100 can be used to affix multiple valve units.

Figure 7:
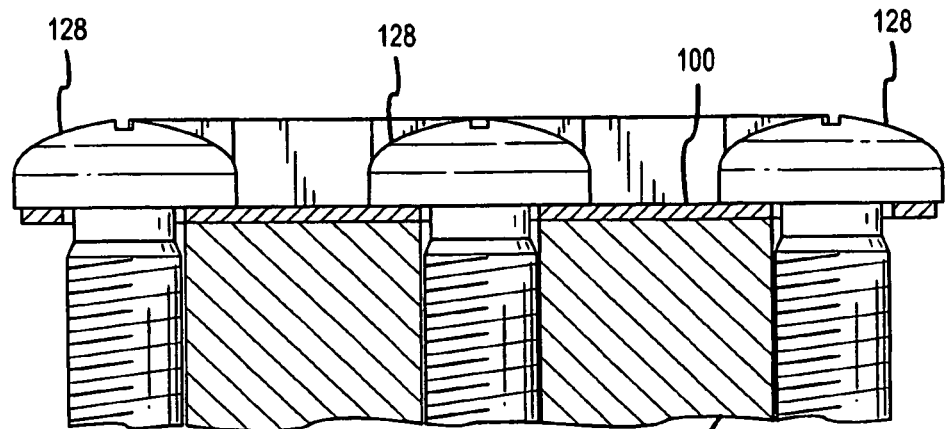
FIG. 7 shows the fastener link assembled to multiple valve units according to an embodiment of the invention.

FIG. 7 shows the fastener link 100 assembled to multiple valve units according to an embodiment of the invention. In this embodiment, the fastener link 100 is assembled to at least a first valve unit 120a and a second valve unit 120b. The fastener link 100 in this embodiment includes more than two enlarged ends 105. Any number of enlarged ends 105 can be employed, as needed.

Figure 8:
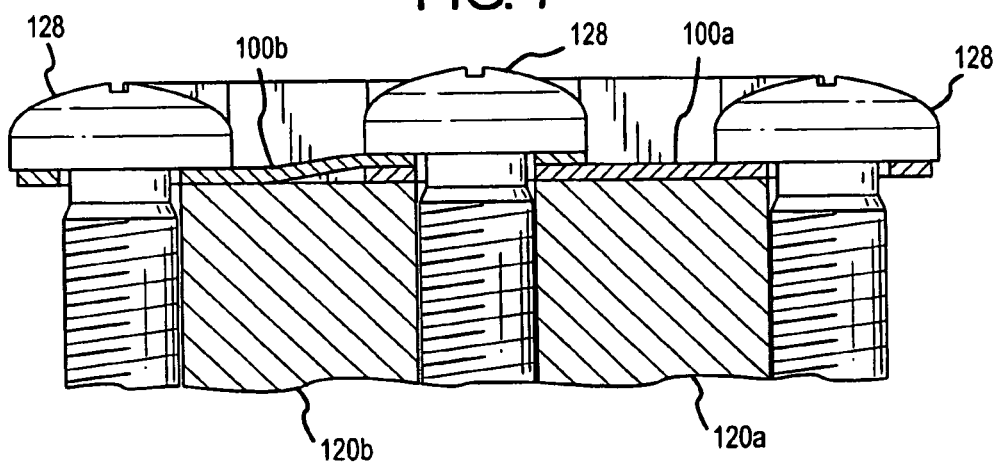
FIG. 8 shows one use of multiple fastener links according to an embodiment of the invention.

FIG. 8 shows one use of multiple fastener links 100a and 100b according to an embodiment of the invention. In this embodiment, a first fastener link 100a is assembled to an underlying first valve unit 120a. Subsequently, a second fastener link 100b is assembled to a second valve unit 120b. Because the first valve unit 120a is in contact with the second valve unit 120b, the second fastener link 100b will rest on and overlap the first fastener link 100a. In some embodiments, the second fastener link 100b will be at lest partially deformed when the corresponding fastener 128 is tightened.

Figure 9:
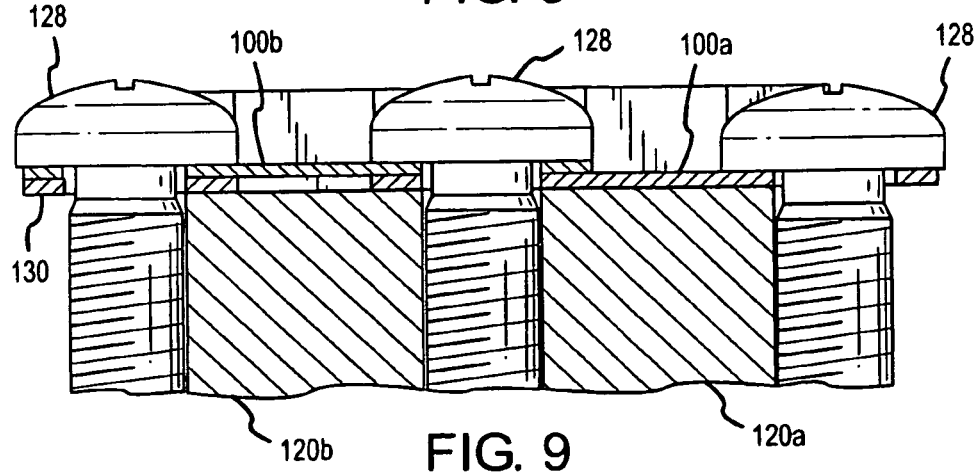
FIG. 9 shows another use of multiple fastener links according to an embodiment of the invention.

FIG. 9 shows another use of multiple fastener links 100a and 100b according to an embodiment of the invention. In this embodiment, the first fastener link 100a is assembled to a first valve unit 120a, as before. Subsequently, a washer or spacer 130 is assembled to the second valve unit 120b, followed by the second fastener link 120b. Consequently, the second fastener link 100b is not deformed when the fasteners 128 are tightened.

A method of fastening a valve unit to a base comprises placing a fastener link onto the valve unit and inserting two or more fasteners through two or more corresponding fastener apertures in the fastener link. The two or more fasteners are held substantially in two or more corresponding fastener grooves formed in two or more sides of the valve unit. The method further comprises affixing the two or more fasteners to the base.

A method of fastening three or more valve units to a base comprises placing two fastener links onto two outer valve units of the three or more valve units, inserting two pairs of fasteners through two pairs of corresponding fastener apertures in the two fastener links, wherein a pair of fasteners is held substantially in a pair of corresponding fastener grooves formed in two or more sides of the corresponding valve unit, and affixing the two pairs of fasteners to the base. In addition, fastener links 100 can be used on valve units other than the two outer valve units. Furthermore, multiple, overlapping fastener links 100 can be used on the valve grouping 400.

A method of fastening two or more valve units to a base comprises placing at least one fastener link onto the two or more valve units and inserting fasteners through corresponding fastener apertures in the at least one fastener link. The fasteners are held substantially in corresponding fastener grooves formed in two or more sides of the corresponding valve unit. The method further comprises affixing the fasteners to the base.

The valve unit and methods according to the invention can be employed according to any of the embodiments in order to provide several advantages, if desired. The invention provides a fastener link that retains fasteners to a valve unit. The invention provides a fastener link that retains fasteners to a valve unit and in fastener grooves formed in a side of the valve unit. The invention provides a fastener link that retains fasteners to a valve unit, wherein the valve unit can comprise one of multiple valve units in a valve grouping. The invention provides a fastener link that retains fasteners to a valve unit, wherein multiple fastener links can be employed on a valve grouping.

What is claimed is:

1. A valve unit (120) being characterized by:
a valve body (121);
at least two fasteners (128) adapted for affixing the valve body (121) to a base;
at least two fastener grooves (125) formed in at least two sides of the valve body (121), wherein the at least two corresponding fasteners (128) rest in the at least two fastener grooves (125) and wherein the at least two fastener grooves (125) are configured to form at least two essentially closed bores when the valve unit (120) is located adjacent a second value unit (120) and a third valve unit (120);

a fastener link (100) comprising at least two enlarged ends (105), at least two fastener apertures (103) formed in the at least two enlarged ends (105), and a central link (106) that extends between and joins the at least two enlarged ends (105), with the at least two fasteners (128) passing through the at least two fastener apertures (103) and with the fasteners link (100) holding the at least two fasteners (128) substantially in the at least two grooves (125); and a corresponding fastener link depression (122) formed in the valve body (121) and shaped to substantially receive the fastener link (100), with the two fasteners (128) holding the fastener link (100) in the fastener link depression (122).

2. The valve unit (100) of claim 1, further comprising a corresponding fastener link depression (122) formed in the valve body (121) and shaped to substantially receive the fastener link (100), with the fastener link depression (122) including a depth that is substantially equal to a thickness of the fastener link (100), wherein the fastener link (100) is at least substantially flush with an exterior surface of the valve body (121) when the fastener link (100) is located in the fastener link depression (122).

3. The valve unit (100) of claim 1, with the fastener link (100) comprising:

enlarged ends (105), with the enlarged ends (105) being split and deformed;

fastener apertures (103) formed in the enlarged ends (105); and a central link (106) that joins the enlarged ends (105).

4. The valve unit (120) of 1, with the fastener link (100) being formed of a substantially elastic material.

5. The valve unit (100) of claim 1, further comprising an indicium formed on the fastener link (100).

\* \* \* \* \*